United States Patent [19]

La Rocca

[11] 4,135,985
[45] Jan. 23, 1979

[54] DESALINATION OF SALT WATER BY SOLAR ENERGY MEANS

[75] Inventor: Aldo La Rocca, Moncalieri (Turin), Italy

[73] Assignee: FIAT Societa per Azioni, Turin, Italy

[21] Appl. No.: 801,977

[22] Filed: May 31, 1977

[30] Foreign Application Priority Data

May 31, 1976 [IT] Italy .............................. 68334 A/76

[51] Int. Cl.² .............................................. B01D 1/00
[52] U.S. Cl. .................................. 202/176; 202/177; 202/234; 203/10; 203/22; 203/23; 203/DIG. 1; 159/1 S
[58] Field of Search .................. 203/DIG. 1, 10, 11, 203/100, 22, 23; 202/234, 177, 180; 159/1 S, 1 SF

[56] References Cited

U.S. PATENT DOCUMENTS

| | | | |
|---|---|---|---|
| 2,813,063 | 11/1957 | Bjorksten | 203/DIG. 1 |
| 2,820,744 | 1/1958 | Lighter | 203/DIG. 1 |
| 2,843,536 | 7/1958 | Mount | 203/DIG. 1 |
| 3,088,882 | 5/1963 | Justice | 202/234 |
| 3,290,230 | 12/1966 | Kobayashi | 202/234 |
| 3,875,926 | 4/1975 | Frank | 126/271 |
| 4,038,969 | 8/1977 | Smith | 126/271 |

*Primary Examiner*—Wilbur L. Bascomb, Jr.
*Attorney, Agent, or Firm*—Sughrue, Rothwell, Mion, Zinn and Macpeak

[57] ABSTRACT

Desalination apparatus using solar energy comprises a main insulated container with a subsidiary preheating container next to it; the main container is covered with a transparent cover serving as a selective filter to provide "the greenhouse effect" and also as a condensation surface for water vapor, and this transparent cover incorporates a hollow space, for example by making the cover double skinned. The hollow space forms part of a syphon which automatically regulates the water levels, transferring salt water from a preheating container to the main container as the level in the main container falls due to loss by evaporation leading to condensation and withdrawal of the desalinated water. The hollow part of the transparent cover thus serves also to preheat the incoming salt water with the heat lost upon condensation by the vapor within the main container.

6 Claims, 6 Drawing Figures

DESALINATION OF SALT WATER BY SOLAR ENERGY MEANS

BACKGROUND OF THE INVENTION

This invention relates generally to the desalination of salt water, by solar energy means, and particularly to an installation for the desalination of salt water, which has no moving parts requiring energy input to prime movers such as, for example, mechanical pumps or electrical pumps for the pumping and circulation of salt water during the desalination process. Such installations can be used with advantage close to coasts, lagoons and salt lakes.

In installations of this type an important design criterion for the system is that the cycle of operations involved in the desalination of salt water should be completely passive, that is one which requires no input of energy for circulating the salt water used for the desalination process. In practice a certain minimum energy input has been required in most prior art systems. Another design criterion is that of minimizing the auxiliary components of the system in order to reduce first cost.

The systems known in the art, however, have many disadvantages, particularly with regard to the use made of the incoming radiant energy inasmuch as a considerable amount of incident energy is not effectively utilized during the condensation phase of the salt water vapour. In known systems a large proportion of the incident radiant energy is lost from the installation when the water vapor, which condenses on the covering glass area, returns to this all the heat of vaporization, which represents the greater part of the thermal energy involved in the process.

OBJECTS OF THE INVENTION

The main object of the present invention is to provide a desalination system which has no moving parts but which conducts the desalination process in a controlled and regulated manner.

Another object of the invention is to provide a desalination system in which the heat given up upon condensation of the water vapor is used for preheating the incoming salt water.

A further object of the present invention is to provide a desalination system in which the intake of salt water to be desalinated is controlled by a static automatic control system.

A further object of the invention is to provide a desalination system in which a syphon is used to transport salt water to be desalinated from an input vessel in which the salt water is collected from the source (salt lake, salt marsh, sea etc.) to a desalination vessel and at the same time effects part of the preheating of the salt water to be desalinated.

SUMMARY OF THE INVENTION

According to the present invention apparatus for the desalination of salt water comprises: at least one main container made of insulating material and adapted for containing water to be desalinated, a transparent cover over said main container, said transparent cover having a highest point and a lowest point and being made from a material which is transparent to short wavelength solar radiation and substantially opaque to longer wavelength heat radiation, whereby said cover acts as a selective filter and also serves as a condensation surface on which water evaporated within said main container can condense, a distillate collection container within said main container located under said lowest point of said cover whereby to collect desalinated water condensing on said cover and running down the underside thereof to said lowest point, a salt water input container adjacent said main container, means for transferring salt water from said salt water input container into said main container, and means for preheating said salt water transferred from said salt water input container before it enters said main container.

Further objects and advantages of the present invention will be more clearly envisioned from the following description of a preferred embodiment in which reference is made to the accompanying drawings. This description is provided purely by way of a non-limitative example.

DESCRIPTION OF THE PREFERRED EMBODIMENTS

Figure 1:
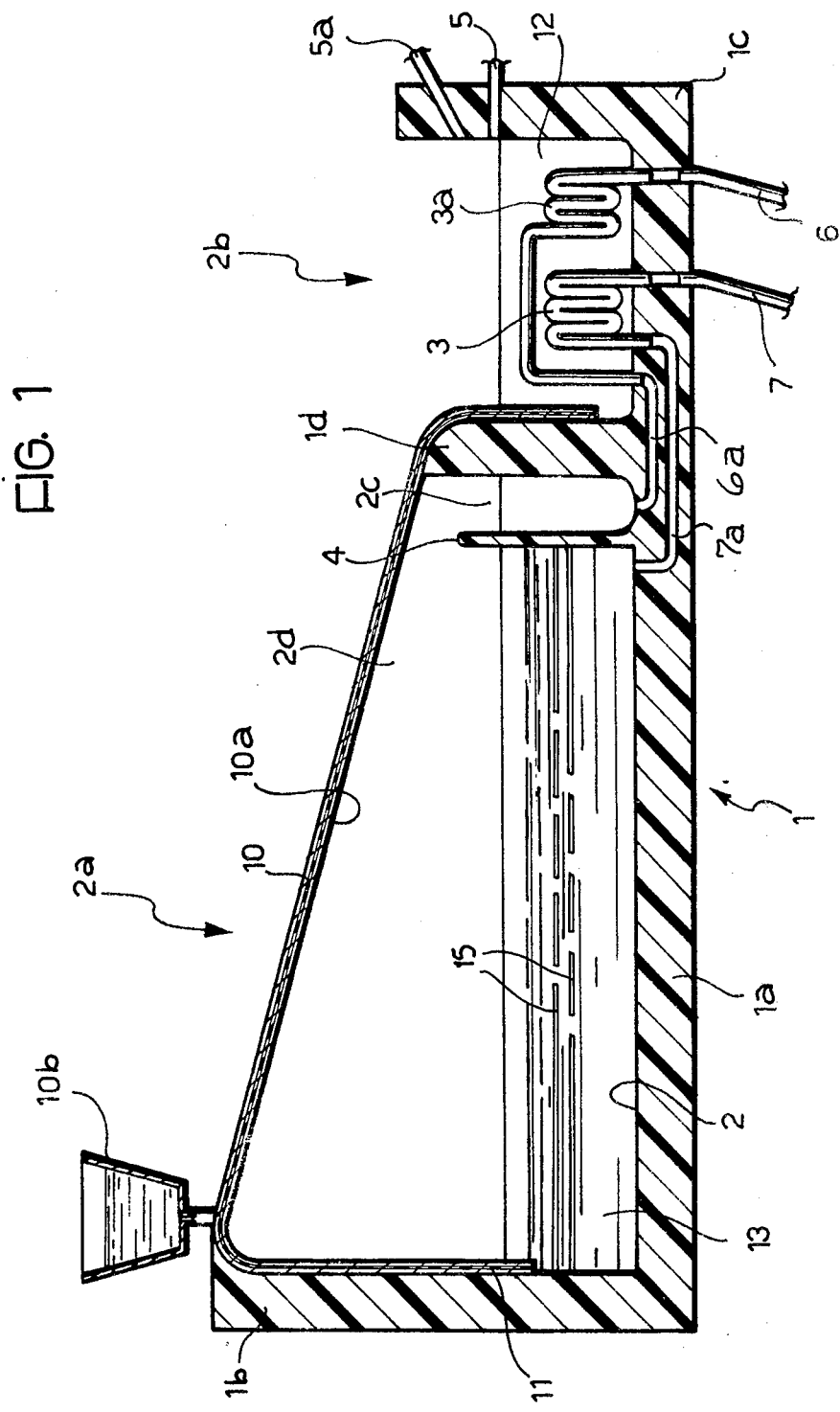
FIG. 1 is a longitudinal section of a desalination installation formed as a preferred embodiment of the invention.

With particular reference to FIG. 1, there is shown a prefabricated construction 1 of thermally insulating material such as, for instance, polyurethane having a supporting base 1a which is generally rectangular in plan, a first side wall 1b, a second side wall 1c which is lower than the first side wall 1b, and two end walls, not shown in the drawing. Extending parallel with the second side wall 1c is an intermediate wall 1d approximately as high as the second wall 1c and forming with the two side walls 1b, 1c and the two end walls, two basins generally indicated 2a and 2b one of which (2a) is very much larger than the other and is separated into two parts by a partition wall 4 running parallel to the intermediate wall 1d. These two parts of the larger basin 2a are generally indicated 2c and 2d, the former of which, the smaller part, is used to collect the desalinated water after condensation, and will therefore hereinafter be referred to as the collection basin, and the latter, 2d, the main part, is used to contain the main body of salt water being desalinated.

The smaller basin 2b serves as an input basin into which flows salt water, from the source thereof through an inlet duct 5a in the second wall 1c. Within the smaller basin 2b there is a pipe coil 3 connected between a discharge duct 7 and a transfer duct 7a from the main part 2d of the larger basin 2a, through which the salt water is periodically discharged when the salt concentration has increased beyond a tolerable level. The coil 3 enables the salt water in the smaller basin 2b to draw heat from the discharging salt water. A second pipe coil 3a is located in the smaller basin 2b for the recovering of the heat from the desalinated water which flows therethrough from the collection basin 2c via a transfer duct 6a on its way to an outlet duct 6. The level of the water in the smaller basin 2b is kept constant by means of an inlet weir 5.

The pipe coil 3 serves for the recovery of heat from the discarded salt water from the main basin 2d and the pipe coil 3a serves for the recovery of heat from the desalinated water drawn off from the collection basin 2c. The smaller basin 2d will therefore be referred to hereinafter as the preheating basin.

The body of salt water 13 situated in the main basin 2d is heated by solar radiaiion which passes through a glass or plastics cover 10 which has two functions. The first of these functions is that of a selective filter for the incident solar radiation, allowing incident radiation to pass through but trapping the relatively longer wave-length radiation which is re-radiated by the body (in this case the water) heated by the incident radiation. The surface layer of water heated by the solar radiation evaporates to form a saturated vapor which when it comes into contact with the internal wall 10a of the glass or plastics cover 10, condenses and runs along the inclined surface to be collected in the collection basin 2c.

It is known that the evaporation process depends only on the free surface area, that is the area of the interface between the liquid phase and the vapor phase, and not on the volume of the body of liquid available. In order to obtain a rapid rate of evaporation of the liquid, and therefore a rapid response of the system to incoming solar radiation it is only necessary for a very thin upper layer of the body of salt water 13 in the main basin 2d to be heated to the temperature at which evap-oration takes place. It is also desirable that this evaporated layer which now contains an increased salt concentration be automatically reformed quickly with water having the initial saline concentration. A static system (that is one without any moving mechanical parts) which is self-regulating is obtained by means of the present invention which provides that the glass or plastics cover 10 be formed with a hollow space, for example by forming the cover 10 of two walls of glass or plastics sheet spaced from one another. The cover 10 is in contact with the water in the preheating basin 2b and the water in the main basin 2d so that the hollow space between the layers of the cover 10 acts as a sy-phon which draws up water from the preheating basin 2b and transfers it to the main evaporation basin 2d whenever the level in the main basin falls below the level of the water in the preheating basin 2b, which latter is kept constant by the weir 5. It should be noted that the action of this syphon is automatic and self-regulating; this therefore functions as a closed circuit control system to feed fresh salt water to the main evap-oration basin 2d whenever, because of the evaporation and subsequent removal of condensed water in the evaporation basin, the level of water falls below that of the preheating basin 2b. In fact, the syphon flow of water from the preheating basin to the main evapora-tion basin will effectively maintain the levels in the main evaporation basin 2d and the preheating basin 2b sub-stantially equal. If the water level in the evaporation basin 2d falls quickly the result is an increase in the flow through the syphon and, therefore, a control action directly related to the two levels of the basins 2a and 2b. The rate of this flow is easily compatible with the pro-duction rate of desalinated water.

Furthermore, the double-wall of the transparent cover plate 10 improves the selective filtering effect of the glass (or plastic material) used for the purpose. As is well known, these materials are highly transparent to the short wave-length radiation which constitutes the greater part of the solar spectrum, and are substantially opaque to radiation of longer wave-length such as the radiation which is re-radiated by a heated body. In the present case the contents of the basin 2a are held at a very low temperature (not more than 100° C.) when compared to the temperature of the sun's surface (6000° C.). This effect of the selective filter, also known as the greenhouse effect, is improved by the provision of two layers to the cover as it cuts down heat loss by conduc-tion at the outer surface of the cover 10. The salt water between the layers also acts as a selective filter.

In addition, the heat lost by the evaporated water when it condenses on the under surface of the cover 10 is given up to the incoming salt water in the hollow space between the layers of the cover 10 thereby pre-heating it before it enters the evaporation basin 2a. The amount of energy thus recovered is of the order of 25% of the radiant energy received.

The self-regulating action of the syphon also ensures that the level of water in the evaporation basin 2a re-mains substantially constant and this facilitates the use of a rapid heating arrangement for heating only a thin upper layer of the liquid since it is only from the surface that evaporation takes place.

Figure 2:
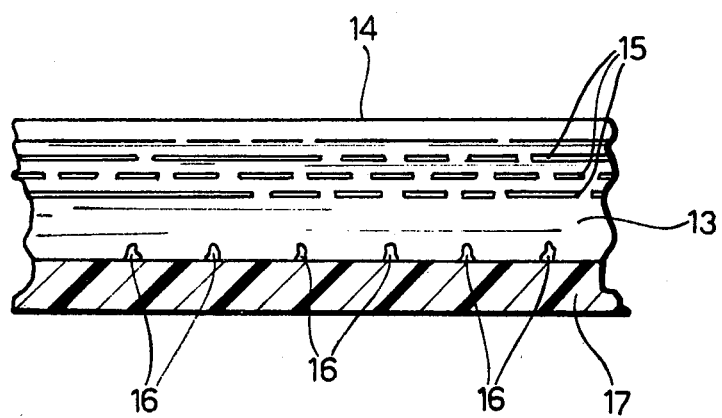
FIG. 2 is a detail section of a further embodiment of the invention showing the heat collector element.

This is obtained by disposing immediately beneath the upper surface layer 14 of the body of liquid 13 which is to be selectively heated to create vapor, sev-eral layers 15 of thin highly absorptive material 15 dis-posed in such a manner as to form a screen which is optically opaque, that is capable of preventing the pas-sage of the sun rays, whilst nevertheless permitting liquid to pass through it. For this purpose the layers 15 which are schematically shown in FIGS. 1 and 2 are mesh screens offset from one another so as to be opti-cally opaque, although they allow the passage of the salt water. The said layers of absorptive material absorb almost all the incident solar radiation by transferring the heat so gained by convection into the layer of salt water immediately above. The convection currents not only transfer heat into the upper surface layer of the salt water, but also, by bringing them into contact with the main body of the water through the mesh screens 15 permit the diffusion of salt water from the upper layer, where it is concentrated by the evaporation, into the main body 13 of the water.

As a result the surface layer is automatically re-formed by means of the syphon 11 of FIG. 1 which discharges the preheated water as a layer onto the screens 15. The lower layers of the body 13 of water in the evaporation basin 2a receive very little heat because the mesh screens 15 limit the incident radiation to the upper layers. Heat is not transmitted by convection to the lower layers because the upper layers and the screens 15 are at a higher temperature, and heat transfer by radiation from these upper layers to the underlying water is minimal in view of the relatively small tempera-ture difference. As a further measure the under surface of the screens 15 could be of high reflectivity and, therefore, of low emissivity, so that the only heat trans-fer mechanism operative would be conduction, which is well known to be low in liquids. It should be noted that with this arrangement of mesh screens 15, the bottom 17 of the basin 2d does not now have to be absorptive, and therefore the emissivity of the surface of the bottom 17 is unimportant. Thus, the formation by crystallization of any salt scales or crystals 16 on the bottom 17, or in fact, in any position between the bottom 17 and the screens 15 of absorptive material, does not deleteriously affect the operation of the system by lowering the absorption (due to the high reflectivity of the scales or crystals) as they would have done in the absence of the screens 15. The result is that a higher degree of salinity in the body 13 of the water in the evaporation basin 2d can be tolerated before the water 13 has to be discarded. In fact, it can be envisaged that solar desalination systems could be so constructed that the only flow of water is the distilled water: in this case a large amount of salt water can be used without recirculation by providing, for example, a sump for collecting crystallised salt. It is also possible to envisage solar desalination plants floating directly on salt waters of lakes or of salt marshes.

Because, with the system of the present invention, only a thin upper layer of the water is heated, the presence of any quantity of water whatsoever in the receptcale scarcely affects the evaporation process. It also follows that the salinity of the body of water at the bottom of the vessel and, therefore, the presence of scales of crystallised salt do not interfere with the absorption of solar radiation, in contrast with the prior art designs, in which the occurrence of reflecting elements such as the salt scales 16 in any position from the bottom upwards interferes with the absorption of solar energy and thus reduces the effectiveness of the plant.

For the purpose of reducing to a minimum the necessity for manual supervision, and for increasing to the maximum the reliability of the installation, it is desirable to make the installation to such dimensions as will maintain uniform and constant the transmission of heat in the hollow space 10 of the glass cover which functions as a syphon, and to balance this transmission of heat with the flow rates of the syphon in use, in such a way as to prevent the formation of the so-called vapor lock due to the occurence of bubbles upon overheating of the water in the hollow space 10.

For the purpose of preventing occurence of a vapor lock even if some bubbles are formed, an accumulator 10b is provided for collecting any air or vapour bubbles which might form. This accumulator 10b is connected at the highest point of the cover plate 10 and extends upwardly therefrom so as to be able to collect these bubbles naturally.

Figure 3:
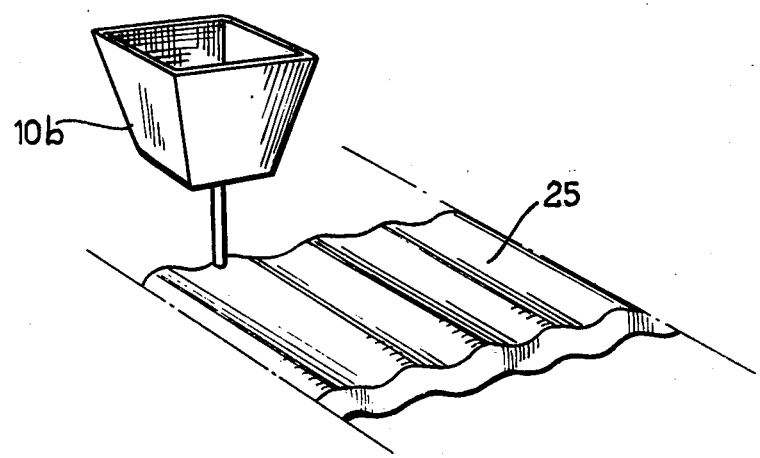
FIG. 3 is a partial perspective view showing an alternative form of the transparent cover.

Having described and illustrated one particular embodiment of the present invention by way of a non-limitative example, those skilled in the art may devise other variations without, however, departing from the scope of the present invention. For example:

In FIG. 3 is shown a corrugated cover 25 which may be used instead of the flat cover 10 of FIG. 1.

Figure 4:
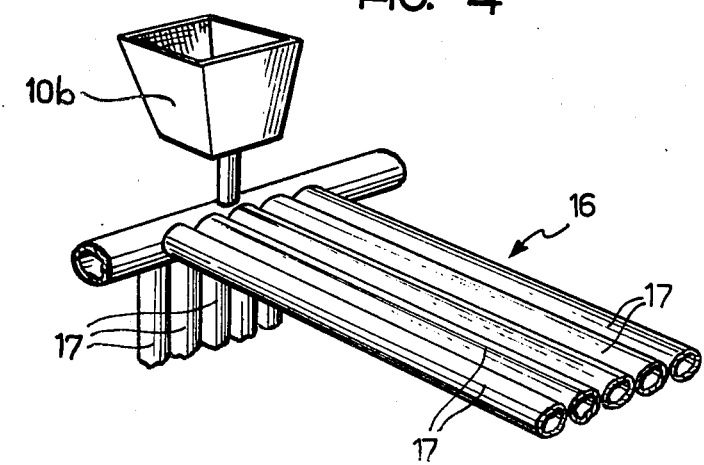
FIG. 4 is a partial perspective view showing an alternative form of the transparent cover.

In FIG. 4 there is shown a cover 16 comprising a plurality of parallel tubes 17 with their sides in contact and joined.

Figure 5:
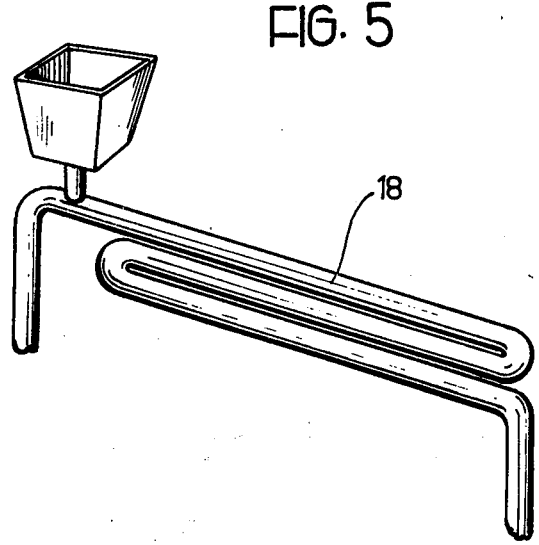
FIG. 5 is a partial cross section showing a further alternative form of the transparent cover.

In FIG. 5 is shown a sectional view of a cover 18 which is folded back on itself several times to provide an extended sinuous path for the water being syphoned from the preheating basin 2b to the main basin 2d, to improve the heat transfer thereto, and the selective filtering effect of the cover.

Figure 6:
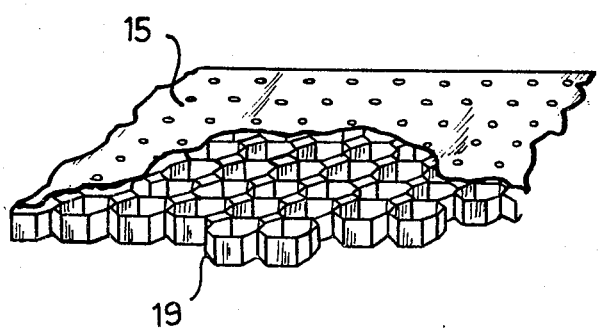
FIG. 6 is a partial perspective view showing an alternative form of the heat collector element.

In FIG. 6 is shown a honeycomb heat collector structure 19 which may be provided instead of or as well as the heat collector screens 15, to reduce convection currents which might transfer heat into the lower layers of the body of water 13 in the main container.

I claim:

1. Apparatus for the desalination of salt water comprising at least one main container made of insulating material and adapted for containing salt water to be desalinated,
 a transport cover for said main container, said transparent cover having a highest point and a lowest point and being made from a material which is transparent to short wavelength solar radiation and substantially opaque to longer wavelength heat radiation, whereby said cover acts as a selective filter and also serves as a condensation surface on which the water evaporated within said main container can condense,
 a distillate collection container within said main container located under said lowest point of said cover to collect desalinated water condensing on the cover and running down the underside thereof to said lowest point,
 a salt water input container adjacent said main container,
 means for transferring salt water from said salt water input container into said main container, and
 means for preheating said salt water transferred from said salt water input container before it enters said main container comprising outlet means for said main container and collection container and pipe coils in said salt water input container, said pipe coils being connected in series with said outlet means from said main container and said distilled water collection container respectively whereby said coils serve as heat exchangers for preheating incoming salt water in said input container with heat from water discharged from said main container and said distilled water collection container.

2. Apparatus as set forth in claim 1, wherein said transparent cover includes means defining a hollow space within said cover and coextensive with at least a portion of the surface of said cover, at least two opposed edges of said transparent cover extending into the water in said main container and said salt water input container respectively with said hollow space within said cover having a first and communicating with the water in said salt water input container and a second and communicating with the water in said main container whereby said hollow space serves as a syphon for transferring water from said salt water input container to said main container.

3. Apparatus as set forth in claim 2, wherein the main area of said transparent cover is comprised of a generally flat double layer sheet.

4. Apparatus as set forth in claim 2, wherein said transparent cover is comprised of a plurality of tubes having their walls in contact with each other.

5. Apparatus as set forth in claim 2, further comprising an accumulator receptacle mounted above said transparent cover and communicating with said hollow space at said highest point of said transparent cover for collecting air and vapor bubbles occuring in said salt water being transferred from said salt water input container to said main container to prevent the formation of a vapor lock which would halt the operation of the syphon.

6. Apparatus as set forth in claim 1, further comprising heat collector means disposed in said main container so as to be disposed just below the surface of the salt water therein, said heat collector means comprising a plurality of thin layers of highly absorptive material having means defining a plurality of openings therein permitting the passage of water across said layers, said openings in adjacent layers being positioned such that said plurality of layers are collectively opaque to solar radiation, while at the same time permitting salt water to pass therethrough to equalize the salinity concentration within said main container.

* * * * *